June 6, 1967 J. GUERIN ET AL 3,323,860
ANDHYDROUS SODIUM CYANIDE AND PROCESS FOR PREPARATION OF SAME
Filed July 2, 1965

INVENTORS
Jean Guerin
Jean Aigueperse
BY Webb, Mackey & Burden
THEIR ATTORNEYS

United States Patent Office 3,323,860
Patented June 6, 1967

3,323,860
ANHYDROUS SODIUM CYANIDE AND PROCESS FOR PREPARATION OF SAME
Jean Guerin and Jean Aigueperse, Grenoble, France, assignors to Societe d'Electro-Chimie, d'Electro-Metallurgie et des Acieries Electriques d'Ugine, Paris, France, a corporation of France
Filed July 2, 1965, Ser. No. 470,343
Claims priority, application France, Aug. 2, 1962, 905,845
5 Claims. (Cl. 23—79)

This invention relates to anhydrous sodium cyanide with high solubility and a process for preparation of same.

Sodium cyanide is principally used for electro-plating, case hardening of steels and chemical reactions.

Until the last few years, this product had been obtained chiefly by the Castner process in which sodium, ammonia and charcoal were treated together at about 650–750° C. The product obtained was in the molten state and was generally sold in the form of eggs or briquettes.

Due to the development of hydrogen cyanide production from methane and ammonia, there appeared on the market sodium cyanide obtained by action of gaseous hydrogen cyanide on soda. This reaction is generally carried out at a temperature near 80° C. By further evaporation of the solution, fine crystals of anhydrous cyanide are formed, which are difficult to dry completely and dangerous to manipulate because of the presence of an important portion of very fine powder. To reduce this danger of manipulation, agglomerating and sintering operations have been recommended. The sintered, anhydrous and compact form is advantageous when using molten sodium cyanide for case hardening operations. However, when cyanide is used for organic reactions or electro-plating, it is preferable to utilize an easily soluble product.

In the process of our invention, anhydrous sodium cyanide in a stable, non-pulverulent and easily soluble form is obtained by limited dehydration of dihydrate crystals $NaCN.2H_2O$. This initial dihydrate can be obtained by our process described in our French Patent No. 338,413, filed July 13, 1962, for "Process for Producing Sodium Cyanide," and in our U.S. patent application Ser. No. 294,064, filed July 10, 1963, now Patent No. 3,241,911, and corresponding to the French application, or by any other method.

Figure 1:
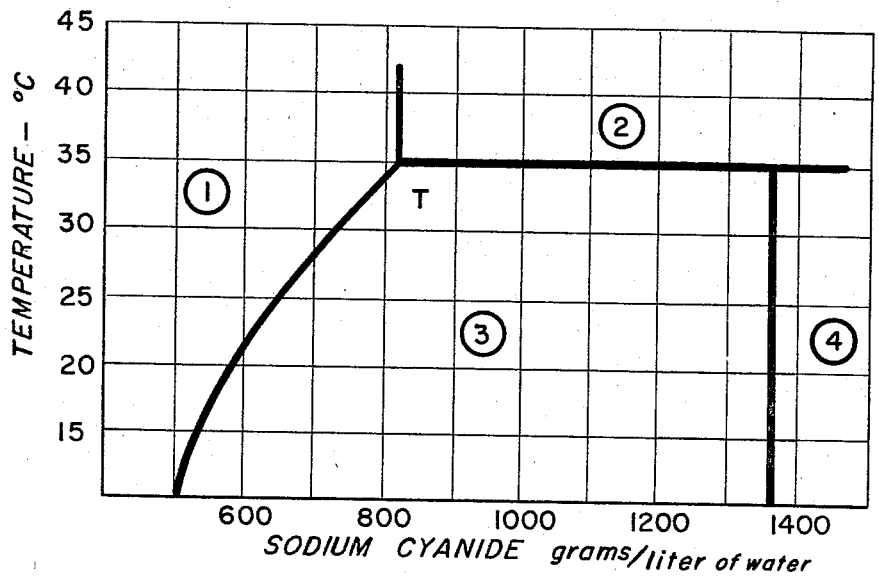
FIGURE 1 is an equilibrium diagram of sodium cyanide and water.

On a sodium cyanide and water equilibrium diagram, shown in FIGURE 1, there is a transition point T which corresponds to a sodium cyanide concentration of 820 g./l. of water at a temperature of 34.7° C.

The numbered zones correspond to the following fields:

(1) NaCN solution in water,
(2) NaCN+solution,
(3) Dihydrate+solution,
(4) Dihydrate+NaCN.

Sodium cyanide dihydrate is stable only below the temperature of 34.7° C. If the dihydrate crystals are suddenly heated above 34.7° C., they melt in their crystallization water. Additionally, from 75° C. to 80° C. an abundant formation of formate occurs. Thus, it appears that the dihydrate drying should necessarily require heating the dihydrate crystals to a temperature slightly below 34.7° C. by means of a gas, preferably dry, which flows out of the apparatus at a temperature not higher than 35° C. However, such a method requires huge quantities of gas, and thereby voluminous and costly equipment.

Our process comprises carrying out drying and dehydrating operations in two steps. The first step is effected by subjecting the dihydrate crystals to a gas or to a gaseous fluid which is chemically inert to sodium cyanide, and which is unsaturated with steam or water vapor and preferably dry. This gas is introduced into apparatus which contains the sodium cyanide dihydrate crystals at a temperature below 60° C. and is discharged at a temperature below 34.7° C. The gas contacts the crystals and its flow is continued until the crystals are brought to a temperature near and below 34.7° C. and contain about or less than 18% water which corresponds to the empirical formula: $NaCN.0.6H_2O$. The second step is effected by subjecting the previously treated crystals to gases which are chemically inert to the crystals, which are unsaturated with steam or wtaer vapor and are preferably dry, and which are introduced at a temperature comprised between 60° C. and 400° C., preferably between 250° C. and 300° C.

When the two-step operation is completed, there is no formate.

It is obvious that the form and the sizes of the grains of anhydrous cyanide depend on the form and the sizes of the starting particles of crystallized dihydrate. When treating big dihydrate crystals (of about 1 to 10 mm.) obtained for example by the process described in the U.S. patent application Ser. No. 294,064 of July 10, 1963, now Patent No. 3,241,911, the obtained product of our invention has retained its initial crystalline form and these crystals may be subjected to the usual manipulations or handling (sacking, filling of containers, etc.) without being broken and without becoming dust or fine powder. In some instances, our product comprises flakes of about 3–10 mm. with an average thickness of about 1 mm. When, on grounds of convenience, one is led to previously comminute the big crystals of dihydrate in grains of about 1 mm., for example in order that they be more easily adapted to fluidization, grains of anhydrous cyanide having identical sizes but not the form of flakes are obtained. Anyhow, the dissolution speed of the obtained product and its reactivity are far higher than those of the other commercial forms of sodium cyanide, such as eggs, briquettes, granules and even powder. The chemical purity of this sodium cyanide is very high, always above 97% and often 98.5%. Furthermore, the product contains no sulphur and is very white. Also, the product of our invention has an apparent porosity of about 47%–52% compared to an apparent porosity of less than 22% for commercially available granulated sodium cyanide. Additionally, our product has a specific surface (measured by B.E.T. method) of at least 0.25 m.$^2$/g. and in some cases greater than 0.35 m.$^2$/g. The specific surface of commercially available granulated sodium cyanide is less than 0.1 m.$^2$/g. This B.E.T. method ascertains the internal surface of a granule from the absorption isotherms of nitrogen at its liquefaction temperature of 78° K. or —195° C. The apparent density of our product is between about 0.4 and 0.5.

The following example shows that this sodium cyanide is particularly suited to the needs of the chemical industry and electroplating and is advantageous in comparison with prior products.

*Example*

In this example, we utilized sodium cyanide dihydrate crystals in the form of flakes of 3 to 10 mm. with an average thickness of about 1 mm., and containing, after drying and before processing, 10% of impregnation mother-liquor.

Figure 2:
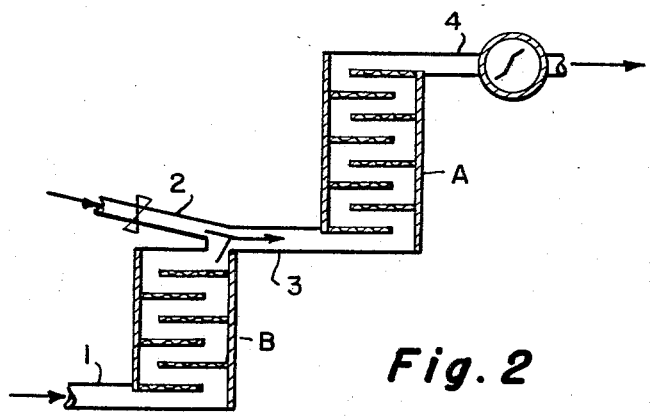
FIGURE 2 is a schematic diagram of the apparatus utilized to prepare our product.

These crystals were distributed in a uniform 20 mm. thick layer on twelve grate-trays of 2 m. by 1 m., placed in a dryer A which is shown in FIGURE 2, a schematic diagram of one apparatus for practice of our process. This dryer was supplied with air at 55° C. and containing 3.4 g. water per m.³. The air exited from the dryer at 32° C. and contained 12.4 g. water per m.³. After hardly less than two hours, the crystals had a water content of 18%.

The trays were then introduced into a second dryer B in which they were heated by air at 300° C. This drying operation was over in less than 15 minutes.

As shown in FIGURE 2, the dryers A and B were in series, with dryer B being supplied through a conduit 1 with air at 300° C. When discharged from dryer B, this air was diluted with a supplementary amount of dry fresh air through a pipe 2 so that the mixture formed thereby was introduced into dryer A through a pipe 3 at 55° C. This mixture was discharged from dryer A through a line 4 at 32° C.

The obtained product contained 98.2% by weight sodium cyanide. Its apparent density was 410 g./dm.³, and its sieve or screen oversize was 60% with a 2.5 mm. mesh sieve and 97% with a 0.8 mm. mesh sieve.

A comparative measurement of the dissolution speed was effected as follows:

20 g. of product were placed on a folded-filter in a filtering funnel. 50 cm.³ of water were poured into the funnel and the first 20 cm.³ of the filtrate were collected. In this filtrate, the quantities of sodium cyanide were determined by dosage. The results were:

(a) The product prepared according to the process of our invention gave 20 cm.³ of a solution containing 232 g. of sodium cyanide per liter;

(b) A commercial granulated product of sodium cyanide gave 20 cm.³ of a solution containing 128 g. of sodium cyanide per liter.

Further evidence of the dissolution speed of the product was shown by carrying out the following procedure:

20 g. of sodium cyanide were placed in a cylindrical glass having a 70 mm. diameter and 50 cm.³ of a solvent was poured in without stirring. After a minute, the resulting fluid was poured through a filter and the quantity of cyanide dissolved in the filtrate was measured. The following values were obtained:

| Solvents Used | Concentration of Obtained Solution | |
|---|---|---|
| | Product of the Example | Commercially available granulated sodium cyanide |
| Water, g./l | 298 | 214 |
| Methanol | 64.5 | 34.5 |
| Ethanol | 17.7 | 10.1 |
| Dimethyl sulfoxide | 24.6 | 14.1 |

While we have shown and described a preferred embodiment of our invention, it may be otherwise embodied or practiced within the scope of the appended claims.

We claim:

1. In a process for preparation of an anhydrous sodium cyanide the invention comprising in a first stage subjecting sodium cyanide dihydrate crystals to a flow of a first gaseous fluid until said crystals have a water content no more than about 18%, said first gaseous fluid being unsaturated with water vapor being chemically inert to sodium cyanide and being at a temperature less than 60° C. to heat said crystals to a temperature less than 34.7° C., in a second stage subjecting said crystals to a flow of a second gaseous fluid which is unsaturated with water vapor, is chemically inert to sodium cyanide and is at a temperature between about 60° C. and 400° C. to obtain said anhydrous sodium cyanide.

2. The invention of claim 1 wherein said first and second gaseous fluids are air.

3. The invention of claim 1 wherein said sodium cyanide dihydrate crystals are flakes of about 3 to 10 mm. with an average thickness of about 1 mm.

4. The invention of claim 1 wherein said first and second gaseous fluids are air and wherein said sodium cyanide dihydrate crystals are flakes of about 3 mm. with an average thickness of about 1 mm.

5. Anhydrous sodium cyanide crystals made in accordance with the process of claim 1 and having an apparent density of about 0.4–0.5 and an apparent porosity of about 47%–52%, a specific surface at least 0.25 m.²/g. and a size of 97% greater than 0.8 mm., said anhydrous sodium cyanide crystals having resistance to breakage from handling and having a dissolution speed after a minute of substantially 298 g./l. in water, 64.5 g./l. in methanol, 17.7 g./l. in ethanol and 24.6 g./l. in dimethylsulfoxide, said speed being determined by placing 20 g. of said crystals in a container and pouring in 50 cm.³ of the solvent without stirring, after a minute the resulting fluid being poured through a filter and the quantity of cyanide dissolved in the filtrate being measured.

References Cited

UNITED STATES PATENTS 2,365,417  12/1944  Kusman _____ 23—79
2,773,752  12/1956  Kremer et al. _____ 23—84 X

FOREIGN PATENTS 487,606  6/1938  Great Britain.

OSCAR R. VERTIZ, Primary Examiner.

J. J. BROWN, G. T. OZAKI, Assistant Examiners.